J. F. O'CONNOR.
ANTIFRICTION SIDE BEARING FOR RAILWAY CARS.
APPLICATION FILED JULY 6, 1909.
980,117. Patented Dec. 27, 1910.
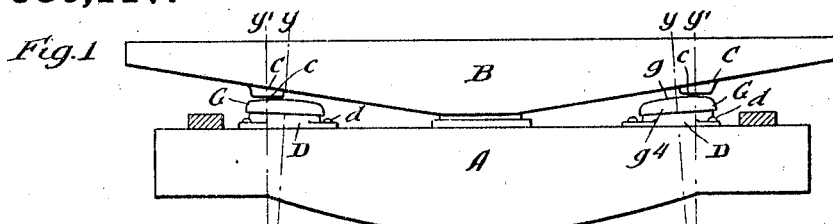
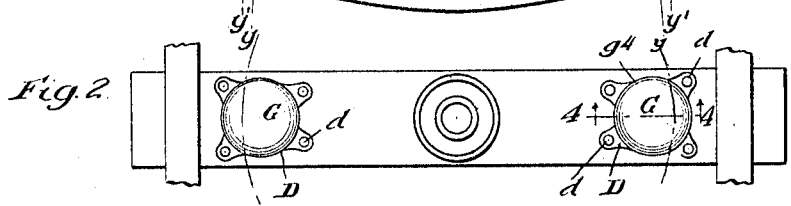
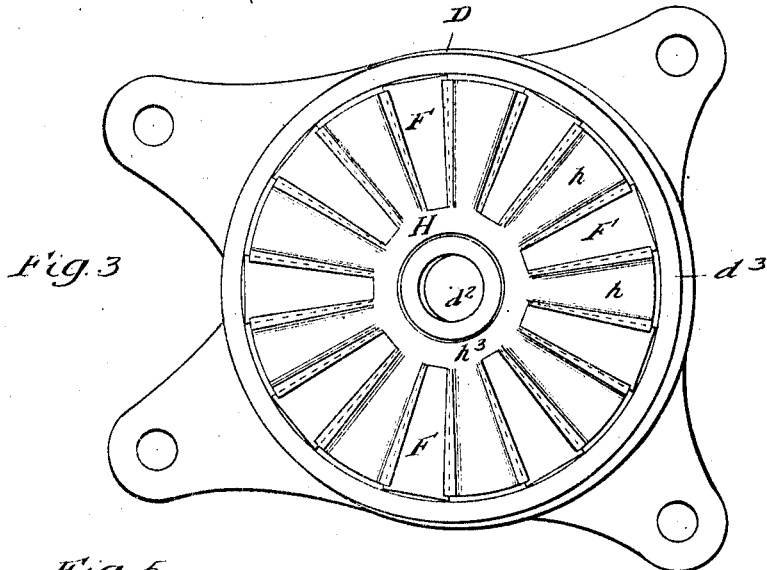
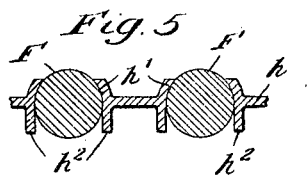
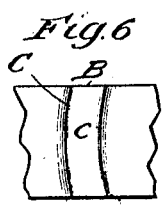
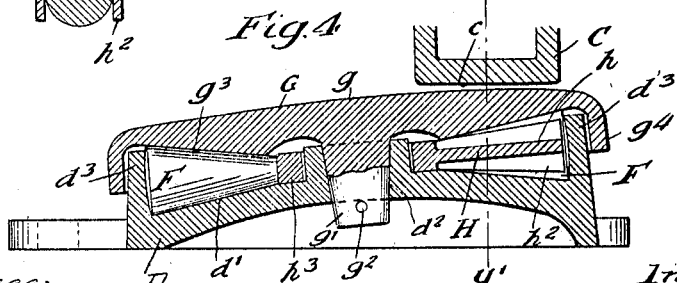
Witnesses:
Wm. Geiger
H. W. Munday
Inventor:
John F. O'Connor
By Munday, Evarts, Adcock & Clarke.
Attorneys

UNITED STATES PATENT OFFICE.

JOHN F. O'CONNOR, OF CHICAGO, ILLINOIS, ASSIGNOR, BY MESNE ASSIGNMENTS, TO WILLIAM H. MINER, OF CHICAGO, ILLINOIS.

ANTIFRICTION SIDE BEARING FOR RAILWAY-CARS.

980,117.  Specification of Letters Patent.  Patented Dec. 27, 1910.

Continuation of application Serial No. 406,649, filed December 16, 1907. This application filed July 6, 1909.

Serial No. 506,178.

*To all whom it may concern:*

Be it known that I, JOHN F. O'CONNOR, a citizen of the United States, residing in Chicago, in the county of Cook and State of Illinois, have invented a new and useful Improvement in Antifriction Side Bearings for Railway-Cars, of which the following is a specification.

My invention relates to anti-friction side bearings for railway cars.

Heretofore considerable objection and difficulty have been experienced in the practical construction and use of anti-friction side bearings for railway cars owing to the fact that but a very limited travel can be secured between the upper and lower bearings or members without unduly increasing the total vertical thickness or height of the anti-friction bearing, as the available space between the body and truck bolsters of the side bearing is necessarily of small extent owing to other conditions of car construction and to the necessity of keeping the load as low as practicable.

The object of my invention is to provide an anti-friction side bearing of a strong, simple, efficient and durable construction which will permit of any desired amount of antifriction travel of the bolsters in respect to each other, and which at the same time may be easily kept within the available space or vertical height which may be taken up by the side bearing without interfering with other necessary conditions of car construction.

My invention consists in the means I employ to practically accomplish this object or result. That is to say it consists, in connection with the upper bearing plate, secured to the body bolster and the lower bearing plate secured to the truck bolster, of a substantially horizontal but slightly inclined anti-friction or rotary circular disk, having a spherical or substantially spherical upper bearing face of large curvature engaging the lower face of the upper bearing plate which is secured to the body bolster, said rotary circular disk being interposed between the upper and lower bearing members, a plurality of radially arranged conical rollers interposed between the anti-friction spherical faced rotary disk and the lower bearing member which is provided with an annular race or track to receive the same, and a roller spacing spider having outwardly flaring radial arms extending between adjacent conical rollers.

My invention consists in the novel construction of parts and devices and in the novel combinations of parts and devices herein shown and described.

In the accompanying drawing forming a part of this specification, Figure 1 is an elevation showing the body and truck bolsters of a car having anti-friction side bearings embodying my invention. Fig. 2 is a plan view with the body bolster removed. Fig. 3 is a detail plan view with the upper bearing plate removed. Fig. 4 is a detail vertical section on line 4—4 of Fig. 2. Fig. 5 is a detail vertical section taken transversely to one of the conical rollers. Fig. 6 is a detail bottom view of the upper bearing member which is secured to the body bolster.

In the drawing, A represents the truck bolster and B the body bolster of a railway car; C is the upper bearing plate or member of my side bearing, the same being rigidly secured to the body bolster; D is the lower bearing plate or member which is rigidly secured to the truck bolster by bolts $d$. The lower bearing member D has an armular tread or race $d^1$ to receive the small conical rollers F which are interposed between the lower bearing plate and the axially inclined rotary spherically faced anti-friction disk G which is interposed between the upper and lower bearing plates C D. This inclined anti-friction circular disk G has a substantially spherical upper bearing face $g$ of large curvature and the disk rotates on an axis which is slightly inclined to the vertical so that the line of contact between the disk G and the upper bearing member C will be substantially horizontal, as will be readily understood from Figs. 1 and 4 of the drawing. The anti-friction spherical inclined disk G is rotatably combined with or mounted upon the lower bearing member D by means of an integral shaft or stud $g^1$ on the disk G which fits in a hole $d^2$ in the bearing plate D and is confined by a key $g^2$ inserted through the stud or shaft $g^1$. The anti-friction circular disk G is furnished with an annular conical race or tread $g^3$ on its lower face to receive the conical rollers F. The anti-friction circular disk G is furnished with an annular flange $g^4$ which surrounds and embraces the corresponding annular flange $d^3$ on the lower bearing plate D, these interengaging flanges additionally locking or rotatably securing the anti-friction disk G and bearing plate D together, and serving to relieve the pivot stud $g^1$ from undue severe strains and also to exclude dirt and cinders from the anti-friction bearing.

H is a roller spacing device or spider interposed between the lower bearing plate D and the anti-friction disk G and having a plurality of outwardly flaring radial arms $h$, one for each roller F fitting between adjacent rollers. These outwardly flaring radial arms $h$ preferably have each two conically curved bearing faces $h^1$ corresponding to the curvature of the conical rollers between which they fit. The radial arms $h$ preferably have straight or flat bearing faces $h^2$ $h^2$ at their lower portions or at the part which projects below the axes of the rollers F.

As the pivot or axis $g^1$ of the anti-friction disk G is inclined from the vertical, the smaller cone-faced race or tread thereon and the corresponding annular cone-faced tread on the lower bearing plate D, it will be understood, are slightly tipped or inclined in respect to the horizontal. The spider H has a hub $h^3$ surrounding the pivot or stud $g^1$ to keep the spider in place. The radial arms of the spider H serve to keep the conical rollers in true radial arrangement.

The center about which the spherical bearing face $g$ of the disk G is struck should be vertically in line with the center line of the upper bearing C as indicated in dotted lines $y$—$y$, $y^1$ $y^1$ in Fig. 1.

This application is filed as a continuation of my original application, Serial No. 329,971, filed August 10th, 1906, continued as Serial No. 406,649, filed December 16, 1907, the said applications having become abandoned.

I claim:

1. In an antifriction side bearing for railway cars, the combination with an upper bearing member having an integral stud and secured to the body bolster and a lower bearing member secured to the truck bolster, and having an upwardly projecting annular hub inclosing the said stud and forming a journal bearing for the same, of a rotatable disk interposed between the upper and lower bearing members, a plurality of radially arranged conical rollers interposed between said disk and the lower bearing member, and a roller spacing spider interposed between the lower bearing member and said rotatable disk, and having an annular hub fitting the hub of said lower bearing member and provided with radial spacing arms fitting between adjacent rollers, substantially as specified.

2. In an anti-friction side bearing for railway cars, the combination with an upper bearing member secured to the body bolster, and a lower bearing member secured to the truck bolster, of a rotatable disk interposed between the upper and lower bearing members, a plurality of radially arranged conical rollers interposed between said disk and the lower bearing member, and a roller spacing spider having cone shaped faces and interposed between the lower bearing member and said rotatable disk, said rotary disk turning on an axis slightly inclined to the vertical, substantially as specified.

3. In an anti-friction side bearing for railway cars, the combination with an upper bearing member secured to the body bolster and a lower bearing member secured to the truck bolster, and provided with an upwardly projecting annular hub, of a rotatable disk interposed between the upper and lower bearing members, a plurality of radially arranged conical rollers interposed between said disk and the lower bearing member, and a roller spacing spider interposed between the lower bearing member and said rotatable disk, said roller spacing spider being provided with an annular hub fitting said hub on said lower bearing member and having a plurality of outwardly flaring cone faced radial arms fitting between adjacent rollers, substantially as specified.

4. In an anti-friction side bearing for railway cars, the combination with an upper bearing member secured to the body bolster and a lower bearing member secured to the truck bolster and having an upwardly projecting annular hub, of a rotatable disk interposed between the upper and lower bearing members, a plurality of radially arranged conical rollers interposed between said disk and the lower bearing member, and a roller spacing spider interposed between the lower bearing member and said rotatable disk, said roller spacing spider having a plurality of outwardly flaring radial arms provided with curved faces at their upper portions, and with straight or flat faces at their lower portions, substantially as specified.

5. In an anti-friction bearing, the combination with a bearing plate having a cone faced annular tread, and provided with an upwardly projecting annular hub, of a rotatable disk having a cone faced annular tread, a plurality of radially arranged anti-friction rollers between said plate and disk and a roller spacing spider between said disk and plate and having an annular hub fitting said hub on said bearing plate and provided with radial spacing arms having cone shaped and straight bearing faces as described fitting between adjacent rollers, substantially as specified.

6. In an anti-friction bearing, the combination with a bearing plate, having a cone faced annular tread and provided with an upwardly projecting annular hub, of a rotatable disk having a cone faced annular tread, a plurality of radially arranged anti-friction rollers between said plate and disk and a roller spacing spider between said disk and plate, having a plurality of outwardly tapering arms fitting between adjacent rollers and furnished with partly cone shaped and partly straight faces, substantially as specified.

7. In an anti-friction bearing, the combination with a bearing plate, having a cone faced annular tread, of a rotatable disk having a cone faced annular tread, a plurality of radially arranged anti-friction rollers between said plate and disk and a roller spacing spider between said disk and plate, having a plurality of outwardly tapering arms fitting between adjacent rollers and furnished with cone faces at their upper portions and with straight or flat faces at their lower portions, substantially as specified.

JOHN F. O'CONNOR.

Witnesses:
H. M. MUNDAY,
PEARL ABRAMS.